United States Patent
Bashar et al.

(10) Patent No.: US 9,681,428 B2
(45) Date of Patent: Jun. 13, 2017

(54) DOWN-SAMPLING OF CELL-SPECIFIC REFERENCE SIGNALS (CRS) FOR A NEW CARRIER TYPE (NCT)

(71) Applicant: INTEL CORPORATION, Santa Clara, CA (US)

(72) Inventors: Shafi Bashar, Santa Clara, CA (US); Jong-Kae Fwu, Sunnyvale, CA (US); Huaning Niu, Milpitas, CA (US); Yuan Zhu, Beijing (CN); Alexei Davydov, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/997,741

(22) PCT Filed: Mar. 18, 2013

(86) PCT No.: PCT/US2013/032869
§ 371 (c)(1),
(2) Date: Jun. 25, 2013

(87) PCT Pub. No.: WO2013/138814
PCT Pub. Date: Sep. 19, 2013

(65) Prior Publication Data
US 2014/0254504 A1    Sep. 11, 2014

Related U.S. Application Data

(60) Provisional application No. 61/612,188, filed on Mar. 16, 2012, provisional application No. 61/646,223, filed on May 11, 2012.

(51) Int. Cl.
*H04W 4/00* (2009.01)
*H04W 72/04* (2009.01)
(Continued)

(52) U.S. Cl.
CPC .......... *H04W 72/042* (2013.01); *H04L 5/005* (2013.01); *H04L 5/0048* (2013.01); *H04J 11/0036* (2013.01)

(58) Field of Classification Search
CPC .... H04W 72/042; H04L 5/005; H04L 5/0048; H04J 11/0036
See application file for complete search history.

(56) References Cited

U.S. PATENT DOCUMENTS 8,520,777 B2 * 8/2013 Lindoff .................. H04L 5/005
375/316
8,750,276 B2 * 6/2014 Wu ...................... H04B 7/0452
370/339

(Continued)

OTHER PUBLICATIONS

Huawei et at., "Downlink reference signals for additional carrier types", 3GPP TSG RAN WG1 meeting # 68, R1-120020, Dresden, Germany, Feb. 6-10, 2012, 3 pages.
(Continued)

*Primary Examiner* — Phuc Tran
(74) *Attorney, Agent, or Firm* — Thorpe North & Western

(57) ABSTRACT

Technology for selecting physical resource blocks (PRB) for cell-specific reference signal (CRS) transmission for a new carrier type (NCT) is disclosed. In an example, device operable in an evolved Node B (eNB) to select physical resource blocks (PRB) for cell-specific reference signal (CRS) transmission for a new carrier type (NCT) can include computer circuitry configured to: Determine a frequency bandwidth for the NCT; and select a CRS pattern of PRBs for a transmission of the CRS in the frequency bandwidth, wherein the frequency bandwidth includes PRBs with CRS and PRBs without CRS.

26 Claims, 11 Drawing Sheets

(51) Int. Cl.
*H04L 5/00* (2006.01)
*H04J 11/00* (2006.01)

(56) References Cited

U.S. PATENT DOCUMENTS

| | | | |
|---|---|---|---|
| 9,131,351 B2* | 9/2015 | Malladi | H04W 4/06 |
| 2010/0271965 A1* | 10/2010 | Siomina et al. | 370/252 |
| 2012/0039283 A1* | 2/2012 | Chen et al. | 370/329 |
| 2013/0094411 A1* | 4/2013 | Zhang | 370/281 |
| 2013/0229972 A1* | 9/2013 | Lee et al. | 370/312 |
| 2014/0036742 A1* | 2/2014 | Charbit et al. | 370/280 |
| 2015/0016239 A1* | 1/2015 | Yi | H04J 11/003 370/201 |

OTHER PUBLICATIONS

Huawei et al., "Control signaling for additional carrier types", 3GPP TSG RAN WG1 meeting # 67, R1-114090, San Francisco, USA, Nov. 14-18, 2011, 4 pages.

NEC Group, "Design consideration for additional carrier type", 3GPP TSG RAN WG1 Meeting # 68, R1-120249, Dresden, Germany, Feb. 6-10, 2012, 3 pages.

Renesas Mobile Europe Ltd., "On DL Control and Reference Signal for New Carrier Type in LTE Rel-11 CA", 3GPP TSG-RAN WG1 Meeting # 67, R1-113889, San Francisco, CA, USA, Nov. 14-18, 2011, 4 pages.

Qualcomm Incorporated, "On the new carrier type in Rel-11", 3GPP TSG-RAN WG1 # 67, R1-114107, San Francisco, USA, Nov. 14-18, 2011, 2 pages.

International Search Report and Written Opinion received for PCT application No. PCT/US2013/032869, mailed on Jul. 18, 2013, 11 pages.

Alcatel-Lucent et al, "Acquisition/Synchronization/Tracking and RS Design for the new Carrier Type", 3GPP TSG-RAN WG1 R-120484, Discussion & Decision, Feb. 2012, Meeting 68, Agenda 7.2.2.1, pp. 3, Dresden, Germany.

Nokia Siemens Network et al., "General Considerations on New Carrier Types", 3GPP TSG-RAN WG1 R-120711, Discussion & Decision, Feb. 2012, Meeting 68, Agenda 7.2.2.2, pp. 4, Dresden, Germay.

Search report for European application 13760568.9 dated Jan. 14, 2016, 11 pages.

ZTE, "Discussion on Some issues of Additional Carrier Types", 3GPP TSG-RAN WG1 R-113754, Discussion & Decision, Nov. 2011, Meeting 67, Agenda 7.2.2, pp. 4, San Francisco, USA.

* cited by examiner $N_{ID}^{cell}=0$ $N_{ID}^{cell}=1$ $N_{ID}^{cell}=2$ $N_{ID}^{cell}=3$ $N_{ID}^{cell}=4$ $N_{ID}^{cell}=5$

DOWN-SAMPLING OF CELL-SPECIFIC REFERENCE SIGNALS (CRS) FOR A NEW CARRIER TYPE (NCT)

RELATED APPLICATIONS

This application claims the benefit of and hereby incorporates by reference U.S. Provisional Patent Application Ser. No. 61/612,188, filed Mar. 16, 2012

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNode B to the UE via a physical downlink shared channel (PDSCH). A physical downlink control channel (PDCCH) can be used to transfer downlink control information (DCI) that informs the UE about resource allocations or scheduling related to downlink resource assignments on the PDSCH, uplink resource grants, and uplink power control commands. The PDCCH can be transmitted prior the PDSCH In each subframe transmitted from the eNode B to the UE.

The PDCCH signal can be designed to be demodulated at the UE based on a cell specific reference signal (CRS). However, the use of a CRS does not take into account the increased complexities of advanced LTE systems. For instance, in heterogeneous networks, multiple nodes can simultaneously transmit within a single cell. The use of the cell specific reference signal can limit advanced techniques to increase cell capacity.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
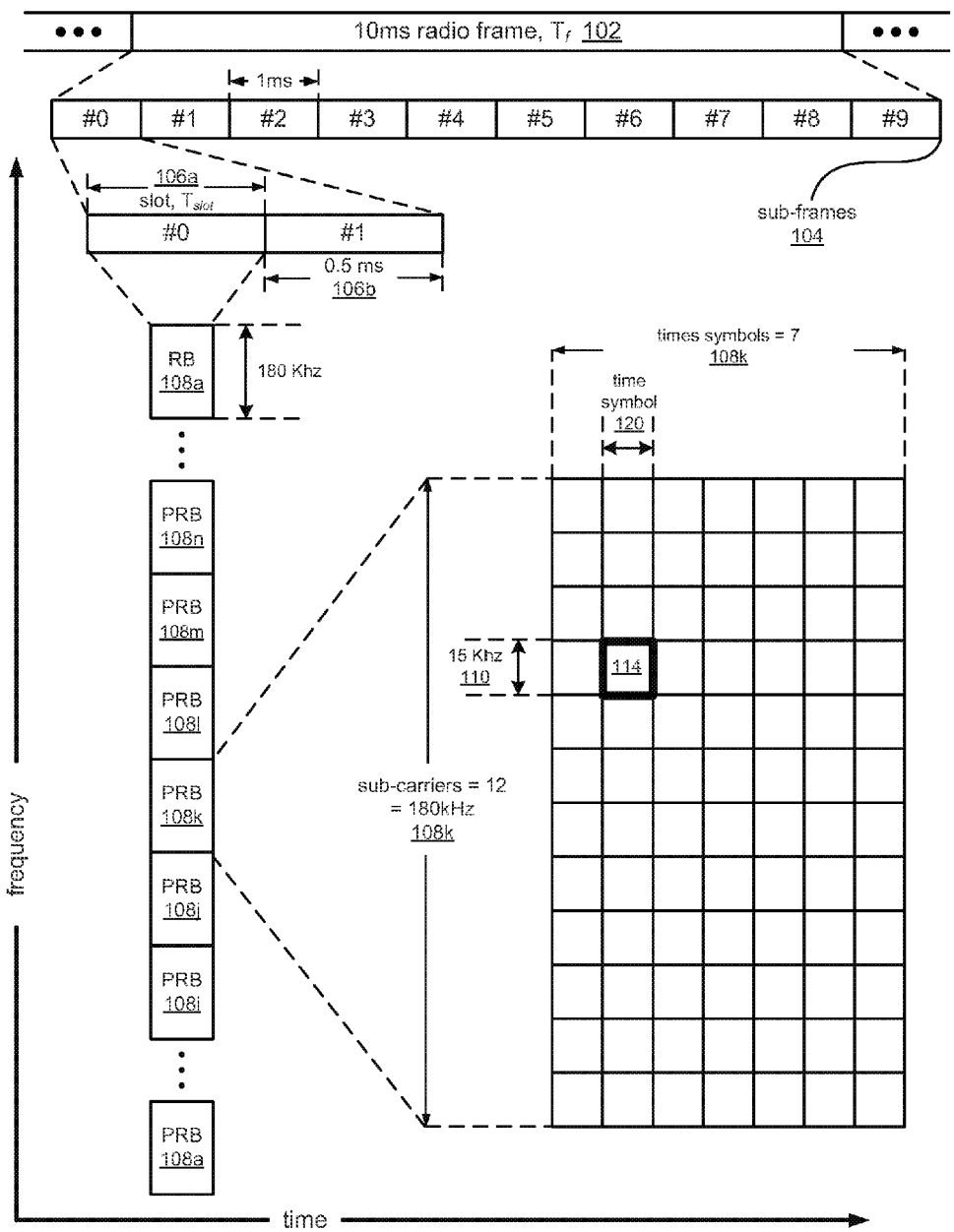
FIG. 1 illustrates a block diagram illustrating a radio frame for an Orthogonal Frequency Division Multiplexing (OFDM) transmission scheme consistent with the Third Generation Partnership Project (3GPP) Long Term Evolution (LTE) standards and its constitutive elements with respect to both time and frequency in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 depicts constitutive elements, with respect to time and frequency, of the Orthogonal Frequency Division Multiplexing (OFDM) transmission scheme employed by the Third Generation Partnership Project (3GPP) Long Term Evolution (LTE) standards. However, other OFDM and non-OFDM modulation schemes are possible. With respect to time in the example, a single radio frame 102, with a duration of 10 ms, is depicted from a stream of frames. The single radio frame comprises a set of 10 sub-frames 104, numbered from #1 to #10 in the expanded cutout of the radio frame. Each sub-frame has a duration of 1 ms. A sub-frame can be further subdivided into two slots (#0 106a, #1 106b), a slot having a duration of 0.5 ms.

The 0.5 ms duration of a slot can coincide with the temporal duration of a PRB 108a-x. A PRB, as further defined in 3GPP TS 36.211, Sections 5.2.3 and 6.2.3, can be the smallest unit of resource allocation assigned by a transmission point scheduler unit within 3GPP LTE standards. Other standards can define analogous units, for purposes of resource assignment, with respect to time and frequency.

In addition to its 0.5 ms temporal span, a PRB also spans a range of frequencies. Individual PRBs have distinct frequency spans, as depicted by the ascending series of PRBs with respect to frequency in FIG. 1. More specifically, an individual PRB 108a-x can include 12 different 15 kHz subcarriers 110 (on the frequency axis) and 6 or 7 time symbols 112 (on the time axis) per slot 106, per subcarrier, depending on whether a normal Cyclic Prefix (CP), 7 time symbols, or an extended CP, 6 time symbols, is used. The various subcarriers and time symbols with respect to frequency and time dimensions can create a grid of 84 Resource Elements (REs) 114, where a PRB 108k comprises 7 time symbols.

Figure 2:
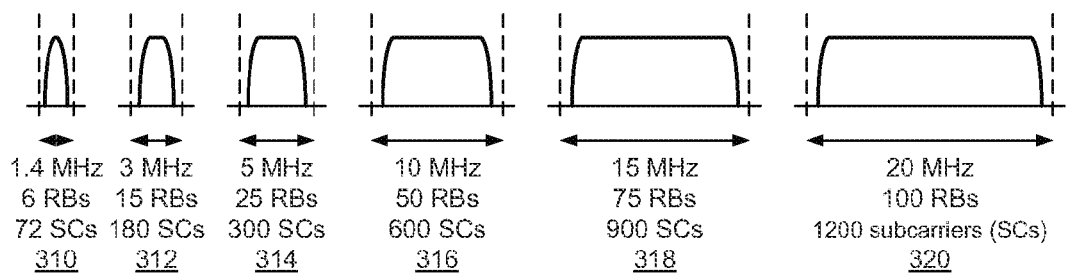
FIG. 2 illustrates a diagram of various component carrier (CC) bandwidths in accordance with an example.

Each wireless device may use at least one bandwidth. The bandwidth may be referred to as a signal bandwidth, carrier bandwidth, or component carrier (CC) bandwidth, as illustrated in FIG. 2. For example, the LTE CC bandwidths can include: 1.4 MHz 310, 3 MHz 312, 5 MHz 314, 10 MHz 316, 15 MHz 318, and 20 MHz 320. The 1.4 MHz CC can include 6 RBs comprising 72 subcarriers. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers.

Figure 3:
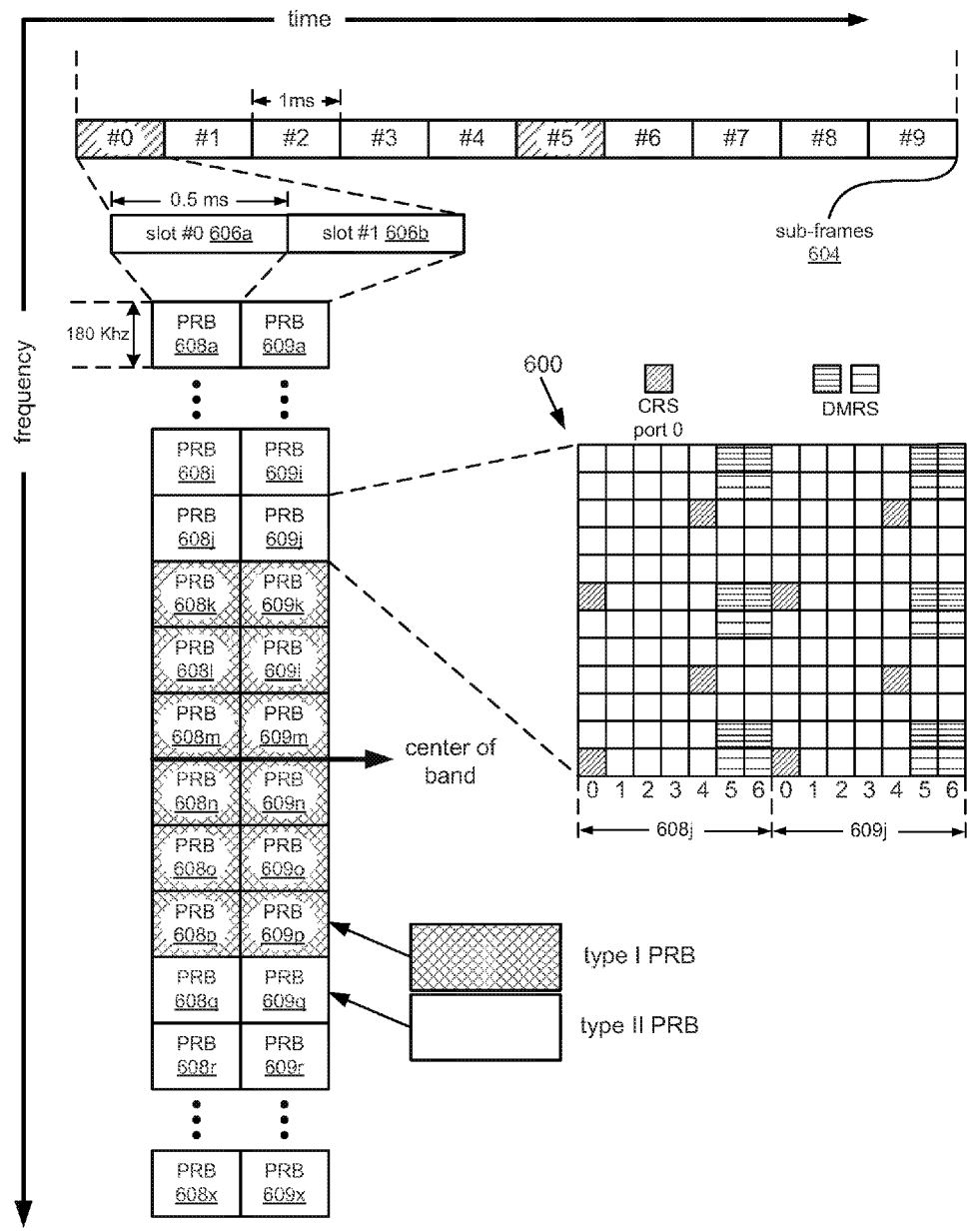
FIG. 3 is a block diagram illustrating center of band physical resource blocks (PRBs) in accordance with an example.

FIG. 3 depicts a first slot, slot #0 202a, and a second slot, slot #1 202b, each pertaining to a PRB within a common sub-frame 200, employing a normal CP. The two PRBs can be within the central 6 PRBs discussed with respect to FIG. 6. The twelve rows, 0-11, make up the 12 sub-carriers of the two PRBs. Since a normal CP is employed, there are 14 columns, or 7 columns for each slot, representing 14 time symbols. T REs occupied by the DMRS of Release 10 on antenna ports 7 through 14 are indicated by the relatively narrow and relatively broad horizontal hatching. The DMRS is mapped to time symbol 5 and time symbol 6, together with time symbol 12 and time symbol 13 for sub-carriers 0, 1, 5, 6, 10, and 11

A new carrier type (NCT) can in LTE Rel-11 (Release 11) reduce and/or eliminate legacy control signaling and/or CRS. The new carrier type can enhance spectral efficiency, improve support for heterogeneous networks (HetNets), and improve energy efficiency. Either a synchronized or unsynchronized carrier type can support the new carrier type.

The new carrier type in Rel-11 can be bandwidth agnostic from a RAN1 point of view with at least a reduced or eliminated legacy control signaling and/or cell-specific reference signal (CRS). From RAN1 perspective the new carrier type (NCT) for carrier aggregation enhanced spectral efficiency, improved support for heterogeneous network, and improve energy efficiency.

The NCT may be used in Rel-12 (Release 12) or Rel-11. Due to time constraint during a timeframe, the new carrier type may be more beneficial in Rel-12. The new carrier type can be non-stand alone or stand alone.

The technology described can be used on acquisition, synchronization, and/or tracking and reference signals for non-synchronized new carriers. A CRS-based solution or a channel state information reference signals (CSI-RS) based solution with a reduced bandwidth and/or a different periodicity from what is defined in Rel-8/9/10 can be used.

The non-synchronized carrier can used different CRS configurations that can be adopted in the new carrier type. Based on different CRS configurations, additional new transmission modes can be used as fallback options for the new carrier type. Methods are also presented related to transmission modes for the new carrier type.

Various CRS configurations can be used for new carrier types. The CRS design can reduce associated overhead from a legacy based CRS design (e.g., Rel-8/9/10) for the new carrier type, while maintaining a sufficient density both in time and frequency to perform a task of frequency/time synchronization, reference signal received power/reference signal received quality (RSRP/RSRQ) measurement, CSI feedback, and similar control signaling. In order to use CRS for these purposes, different schemes of CRS overhead reduction for the new carrier type design can be used. For example, CRS overhead can be reduced in a frequency domain. In another example, CRS overhead can be reduced in a time domain. In another configuration, the antenna ports used for CRS can be reduced. A hybrid combination of reduced CRS in the frequency domain, reduced CRS in the time domain, can reduced antenna ports used for CRS can be used.

Reducing CRS overhead in frequency domain can include using down-sampling of Rel-8 based CRS in frequency domain with different down-sampling rules, or using a pre-defined hopping pattern to select CRS.

Technology (e.g. method) for down-sampling of Rel-8 based CRS in frequency domain with different down-sampling rules is described below. Down-sampling of Rel-8 based CRS in frequency domain or reduced bandwidth (BW) CRS transmission can include reduced bandwidth (BW) CRS transmission in a central k physical resource blocks (PRE) or reduced BW CRS transmission with a distributed pattern.

In a reduced BW CRS transmission in central k physical resource blocks (PRB, a central k PRBs can be selected for transmission of CRS. The value of k can be 6, 12, 15, 18, or other number of PRBs.

Figure 4A:
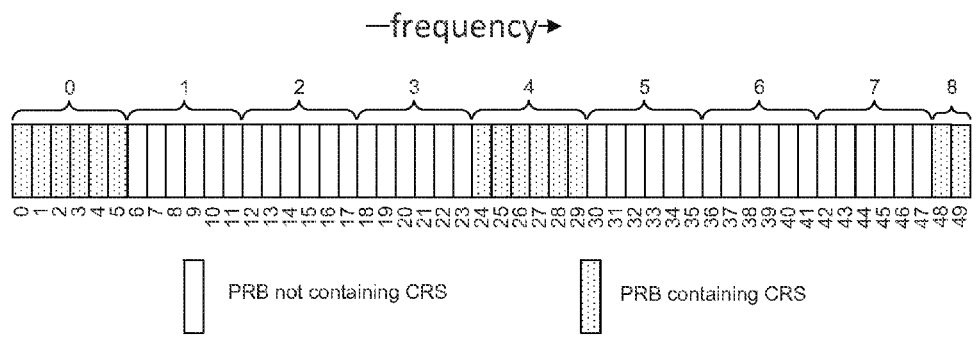
FIG. 4A illustrates a diagram of reduced cell-specific reference signals (CRS) overhead with a CRS distribution pattern including a subband of CRS physical resource blocks (PRBs) at central PRBs and edge PRBs in a frequency domain in accordance with an example.

In a reduced BW CRS transmission with distributed pattern, a set of $k_1$ different subbands can be selected for CRS transmission. In LTE, a subband is a set of k contiguous PRBs where k is a function of the system bandwidth. For example, FIG. 4A illustrates a 6 PRB subband (e.g., 1.4 Mhz). In addition to the existing subband size defined in Table 7.2.1-3 of 3GPP LTE Release 10 TS 36.213, additional subband sizes can be also be defined. The range of $k_1$ can be 1 to $\lceil N_{RB}^{DL}/k \rceil$, where $N_{RB}^{DL}$ is the system bandwidth in PRBs.

In order to facilitate the task of synchronization, RSRP/RSRQ measurement, CSI feedback measurement, and other control signaling, the location of the subbands selected for CRS transmission can be distributed over the entire system bandwidth of the new carrier type by using a pre-defined or configurable pattern. Some example patterns are illustrated in FIGS. 4A-D and described by the following examples (but not limited to the following illustrated examples).

Figure 4B:
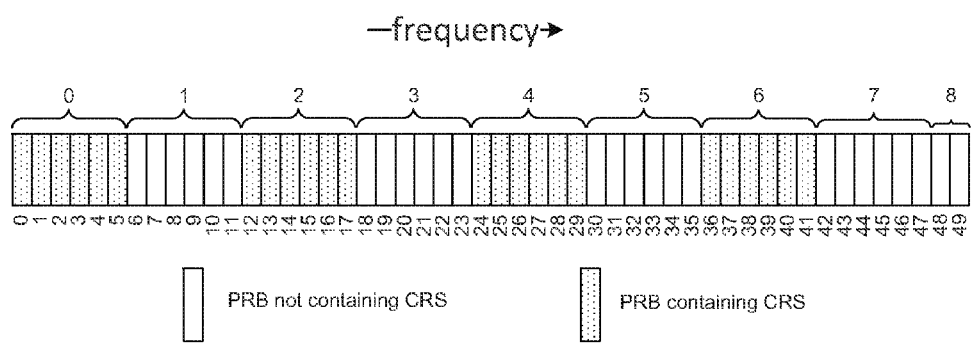
FIG. 4B illustrates a diagram of reduced cell-specific reference signals (CRS) overhead with a CRS distribution pattern including four subband of CRS physical resource blocks (PRBs) in a frequency domain in accordance with an example.
Figure 4C:
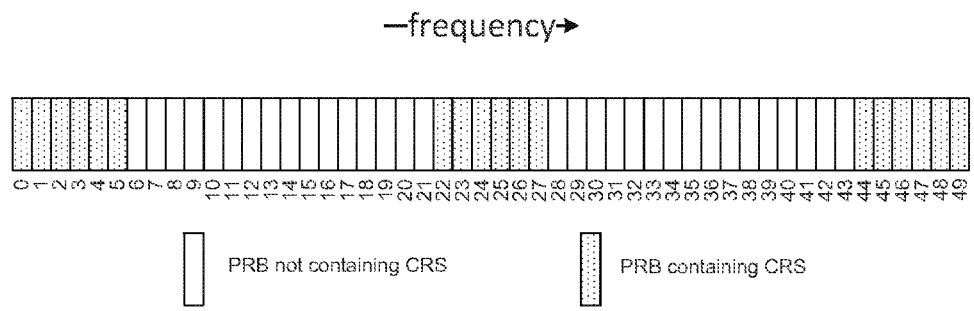
FIG. 4C illustrates a diagram of reduced cell-specific reference signals (CRS) overhead with a CRS distribution pattern including a subband of CRS physical resource blocks (PRBs) at central PRBs and edge PRBs in a frequency domain in accordance with an example.
Figure 4D:
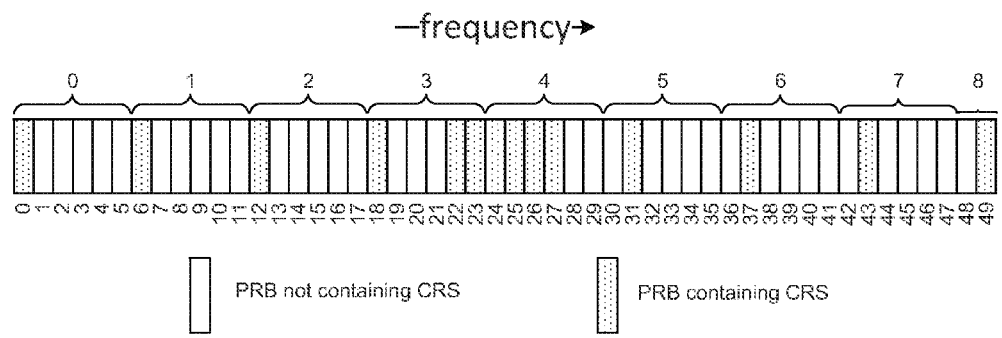
FIG. 4D illustrates a diagram of reduced cell-specific reference signals (CRS) overhead including a subband of CRS physical resource blocks (PRBs) at central PRBs plus a distributive pattern of CRS PRBs in a remaining number of PRBs in accordance with an example.

FIG. 4A illustrates a 10 MHz bandwidth (i.e., 50 PRBs) transmission using k1=3 (e.g., 3 subband groups). A subband (e.g., at least 7 1.4 MhZ subbands) starting at the lowest frequency (subband #1), a subband in the central frequency (subband #5), and a subband at the highest frequency (subband #9) can be selected for CRS transmission. FIG. 4B illustrates a 10 MHz bandwidth transmission using k1=4, where subband #1, 3, 5 and 7 or subband #2, 4, 6 and 8 can contain CRS transmission. By using a subband definition in Rel-8/9/10, a last subband size may be smaller. For example, in 10 MHz bandwidth, subband #8 may only contain 2 PRBs. For CRS transmission purpose, alternative arrangement of PRBs can be bundled together to form a subband. For example, PRB #1 to PRB#6 can form the subband at the lowest frequency, PRB #22 to PRB#27 can form a subband at central frequency and PRB #44 to PRB #49 can form a subband at the highest frequency, as illustrated in FIG. 4C. The PRBs included in these subbands can contain CRS, whereas the rest of the PRBs may not contain CRS. FIG. 4D illustrates using the center subband of 6 PRBs, plus some PRBs distributively selected from the remaining TBs (e.g. choose one PRB from every k RBs to transmit CRS).

Other similar configurations using different values of k1 and k and also other different arrangement of PRBs in a subband in addition to the above described examples are also considered within the scope of this description.

Figure 5:
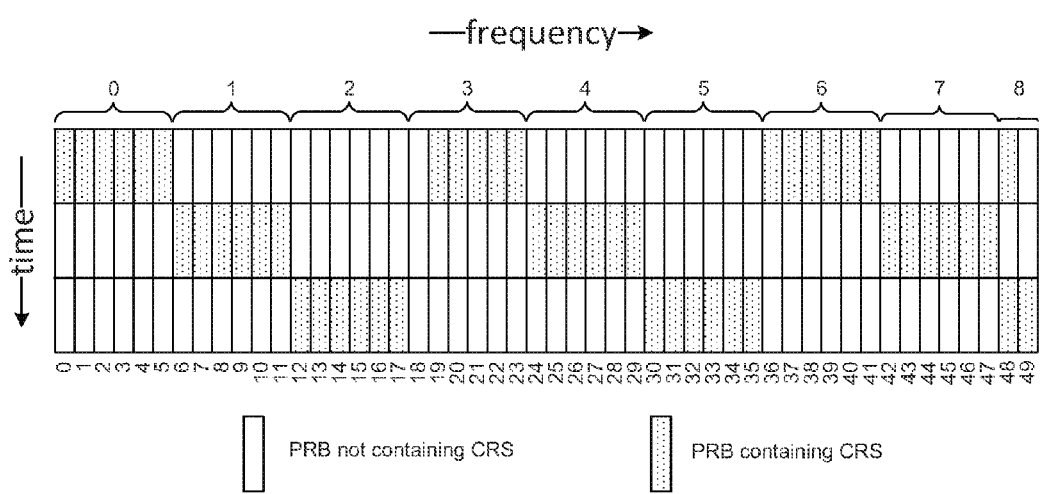
FIG. 5 illustrates a diagram of reduced cell-specific reference signals (CRS) overhead using a pre-defined hopping pattern in accordance with an example.

In another example, using pre-defined hopping pattern can be used to select PRBs with CRS. A subset of CRS PRBs to keep in a subframe can be chosen to reduce the CRS overhead. The selected CRS PRBs can change overtime with certain hopping rules (e.g. hopping from subframe-to-subframe or hopping every k1 subframes or hopping every k2 frames), as illustrated in FIG. 5.

The reduced CRS patterns used for reduced BW CRS transmission in the frequency domain previously described (e.g., both centralized and distributed schemes) can be utilized as initial CRS PRB patterns. The set of PRBs or subbands containing the CRS can vary based on a certain (e.g. pre-defined) hopping pattern. By using hopping from subframe to subframe, an effective wider bandwidth can be achieved and/or covered which can facilitate better feedback measurements. An example of such hopping is provided in FIG. 5 with the subbands containing CRS shown in Table 1.

TABLE 1

| Subframe Index | Subbands containing CRS |
| --- | --- |
| 1 | {1, 4, 7} |
| 2 | {2, 5, 8} |
| 3 | {3, 6, 9} |
| 4 | {1, 4, 7} |
| ... | ... |

Other possible hopping configurations can also be used. Such hopping pattern can also be configurable by RRC and can vary between different eNodeB to avoid or minimize excessive interference caused by the CRS signaling.

CRS overhead can also be reduced in the time domain. Reducing CRS overhead in time domain can be achieved by down-sampling of Rel-8/9/10 based CRS in time. In Rel-8/9/10, CRS can transmitted in every subframes (i.e., with 1 ms periodicity). In the new carrier type, CRS can be configured to be transmitted every/subframes apart, i.e. with ms periodicity. In addition, the subframes containing CRS in a frame can be pre-defined and configurable by RRC. Additional enhancement in performance can be achieved if different eNodeB is configured to transmit CRS in different subframes, thereby reducing interference in the CRS.

The antenna ports used for CRS can be reduced. Another enhancement in reducing CRS overhead in a new carrier type can reduce the CRS transmission to one antenna port or any other number of antenna ports less than total available antenna ports.

Any hybrid combination of reduced CRS transmission schemes as describe above (e.g., reduction in frequency, reduction in time, and reduction in antenna ports) can be incorporated together. As for an example in Rel-11 new carrier type, only one antenna port CRS can be transmitted with a 5 ms periodicity in the central 18 PRBs. Other combinations can also be used.

New transmission modes can also be used in the new carrier type. LTE transmission modes 7, 8 and 9 can be based on UE specific reference signal (UERS or DMRS) for data demodulation and can be supported in new carrier type. DMRS based transmit diversity mode may not be specified and/or supported in Rel-8/9/10. In addition, down-sampling of CRS from the new carrier type can have impact on the fall-back mode support. Therefore, new transmission mode can be used in the new carrier type for fall-back mode support. Various described technologies of supporting new transmission modes in the new carrier type can be used.

Transmission mode 7, 8, 9, and 10 can support DeModulation Reference Signal (DMRS) based transmission as their primary transmission mode. However, in case such primary transmission fails, a fallback transmission scheme can be used instead. The fallback transmission mode for these different transmission mode are listed below:

In TM 7, if number of PBCH antenna port is 1, then single antenna port transmission using port 0 (CRS based). Otherwise transmit diversity (CRS based). In TM 8. If number of PBCH antenna port is 1, then single antenna port transmission using port 0 (CRS based). Otherwise transmit diversity (CRS based). In TM 9, for non-MBSFN subframe, if number of PBCH antenna port is 1, then single antenna port transmission using port 0 (CRS based). Otherwise transmit diversity (CRS based). For MBSFN subframe, single antenna port transmission using port 7 (DMRS based). A DMRS based fallback transmission schemes can be used for transmission mode 7, 8, 9, 10. The fallback transmission scheme can include using DMRS port 7 based single antenna transmission (as used in case of TM9, MBSFN subframe), DMRS based transmit diversity scheme, or DMRS based open loop cyclic delay diversity.

In an example, NCT may not defined as a carrier without PDCCH. However, since in NCT, CRS may not be used for demodulation, PDCCH cannot be used for control signal transmission.

In a the fall-back transmission mode for RBs with CRS, down-sampling CRS in frequency or in time as described in previous sections, can preserve some PRBs with CRS in Rel-11 new carrier type. These PRBs with CRS can be used to support transmit diversity using antenna port 0, 1.

Another option is using single antenna port mode with the CRS configurations. The PRBs containing CRS can be used to support single antenna port transmission using port 0.

The RBs with CRS removed (without CRS) can use different transmission modes. For example, the fall-back transmission mode can be used for RBs without CRS.

In a single Antenna port mode using UERS, in transmission mode 9, if a UE is configured by higher layers to decode PDCCH with CRC scrambled by C-RNTI, then for MBSFN subframes, single-antenna port transmission using port 7 (i.e. UERS based demodulation) is possible. However, such options may not be available for transmission mode 7 and 8. Therefore, in order to support fallback transmission using UERS based single-antenna port mode, an option can be extended for transmission mode 7 and 8. To enable these options, some changes can be made in Table 7.1-5 of 3GPP LTE Release 10 TS 36.213 for Mode 7 and Mode 8.

For a fallback transmission of Transmission mode 9, in case of fallback transmission, if the transmission occurs in MBSFM subframe, then single antenna port 7 can be used for demodulation.

In open loop CDD mode using UERS, a new transmission mode can be defined for the new carrier type using a UERS based transmission mode, similar to the transmission mode 3, by enabling support for open loop CDD from rank 1 to rank 8. The new transmission mode can also be used as a fallback option for the existing transmission mode 7, 8 and 9 in the new carrier type. A detail description of a transmission mode for the open loop CDD mode using UERS is shown and described in Patent Application No. PCT/US11/54472 to Xiaogang Chen, et al., entitled "LARGE DELAY CYCLIC DELAY DIVERSITY (CDD) PRECODER FOR OPEN LOOP MULTIPLE-INPUT MULTIPLE-OUTPUT (MIMO)," filed Oct. 1, 2011, which is herein incorporated by reference in its entirety.

TM3 can be an open loop cyclic delay diversity, which can be defined in LTE. TM3 can be CRS based. Open loop cyclic delay diversity can use DMRS for fallback instead of CRS. DMRS based open loop cyclic delay diversity techniques can be used as a fallback transmission schemes for transmission mode 7, 8, 9, and 10.

In NCT, only some of the PRBs contains CRS. In NCT, for fall back transmission of transmission mode 7, 8, 9 and 10, these PRBs containing CRS can use the CRS based single antenna transmission (using port 0) or transmit diversity. However, PRBs containing CRS may not use a fallback. For the PRBs, that do not contain CRS, a DMRS based fallback transmission mode can be defined.

PRBs containing CRS and use existing CRS based fall-back transmission and PRBs not containing CRS can use proposed DMRS based fallback transmission, or PRBs (regardless of containing CRS or not) may not use proposed DMRS based fallback transmission.

In transmit diversity mode using UERS, a UERS based transmit diversity mode can be defined using antenna port 7 and 8 for the new carrier type in Rel-11. If down-sampling of Rel-8 based CRS in frequency domain as described before is adopted, then in the PRBs containing CRS, UE can have two options for decoding the pilots in those PRBs. In option 1, decoding using UERS port 7, 8 (assuming CRS is still transmitted and can be used). Or in option 2, decoding using CRS port 0, 1 (assuming UERS is not transmitted).

By using option 2, saving of UERS overhead in those PRBs with CRS can be achieved. One method of achieving option 2 is by changing the related specifications, so that a UE can use CRS for decoding for the PRBs where it is transmitted. For these PRBs containing CRS, eNodeB will limit transmission of UERS.

CRS based decoding scheme (option 2) can suffer from CRS related issue, especially for cell range expansion scenarios due to the interference caused by range extension bias. Therefore, an optional one bit signaling to switch between option 1 and option 2 can be implemented in DCI or RRC. Alternatively, the signaling of choosing between the two options can be tied to an existing signaling such as bias signaling.

CRS transmission with a periodicity of 5 ms (i.e. one subframe out of every 5 subframe contains CRS) can be defined. In addition, CRS may not be used for demodulation purpose. As a result, legacy control signaling using PDCCH may not be possible in NCT since PDCCH demodulation is based on CRS.

In an example, the new carrier type can carry 1 RS port (consisting of the Rel-8 CRS Port 0 REs per PRB and Rel-8 sequence) within 1 subframe with 5 ms periodicity. The RS port may not be used for demodulation. Bandwidth of the RS port can be full system BW, min(system BW, X) where X is selected from {6, 25} RBs, or configurable between full system BW and min(system BW, X)

A CRS design in NCT can be different from Rel-8 design. Various design concepts for CRS in NCT are described.

For example in design 1, in Rel-8 CRS design, a cell-specific frequency shift $v_{shift}=N_{ID}^{cell}$ mod 6 can be applied to the patterns of CRS. However, since in NCT design, the usage of CRS can be different from Rel-8, the cell-specific frequency shift applied in Rel-8 transmission may be re-design. In the first design, a modified CRS can be designed by removing or disabling the frequency shift of the CRS.

In a design 2, in Rel-8 CRS design, CRS can be transmitted in every subframe. However, in NCT design CRS can be transmitted with 5 ms periodicity (i.e., only one subframe out of every five subframes or two subframes in a radio frame (10 subframes) will contain CRS reference signal). Technology is described to indicate the subframe containing CRS. In the second design a signaling mechanism can be used to indicate the CRS subframe positions in a radio frame.

Referring by to design concept 1, in Rel-8 CRS design, a cell-specific frequency shift can be applied to the patterns of cell-specific reference symbols (CRS). The following design consideration can be taken into account for such a shift.

Cell-specific frequency shift can be used for collision avoidance with neighboring cell CRS. The idea behind applying such frequency shift can be to introduce a shift such that the time-frequency mapping of CRS signals of a particular cell can be different from adjacent cells. This shift can help to avoid collisions between cell-specific RSs among up to six adjacent cells.

Avoidance of collisions can be particularly relevant when the transmission power of the CRS is boosted, as is possible in LTE up to a maximum of 6 dB relative to the data REs. RS power-boosting can improve channel estimation in the cell when cell-specific frequency shift on CRS is used.

However, if adjacent cells transmit high-power RSs on the same REs, the resulting inter-cell interference will prevent the benefit from being realized. By avoiding such collisions with CRS signals from neighboring cell, the channel estimation of a particular cell can improved, especially, when CRS power boosting is applied.

Cell-specific frequency shift can be used for improved interference measurement: Another motivation of using cell-specific frequency shift for CRS in Rel-8 was interference measurements performance, where CRS colliding with PDSCH is desirable in order to capture PDSCH loading information of the interfering cell.

However, the CRS may not be used for demodulation purpose in NCT. The main purposes of CRS in NCT can be used for time and frequency tracking, and radio resource management (RRM) measurement.

Even though, the application of CRS shifting is avoiding the collision of neighboring CRS signals, CRS signals from neighboring cells collides with the PDSCH transmission. This causes additional interference to the PDSCH transmission, especially when CRS boosting is used. Since, in NCT design CRS signals may not be used for demodulation, (i.e. channel estimation may not be based on CRS signals), potential benefit can be realized by keeping the CRSs in the neighboring cells in the same position instead of applying a frequency shift. Specifically, for eICIC and CoMP design, it can be desirable to avoid CRS collision with PDSCH. In addition, for NCT CRS may not be panned to be used for interference measurements. Therefore, the application of CRS shift in frequency may in fact be detrimental in the NCT. Therefore, it may be beneficial not to use CRS shift in NCT.

For design #1-1, the CRS design can be modified for NCT by removing or disabling the frequency shift of the CRS.

For example, the following modification (shown in italics font) can be made in section 6.10.1.2 of 3GPP LTE Release 10 TS 36.213.

The reference signal sequence $r_{l,n_c}(m)$ shall be mapped to complex-valued modulation symbols $a_{k,l}^{(p)}$ used as reference symbols for antenna port p in slot $n_s$ according to $$a_{k,l}^{(p)} = r_{l,n_g}(m')$$

where $$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

The variables v and $v_{shift}$ define the position in the frequency domain for the different reference signals where v is given by $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

For legacy carrier, the cell-specific frequency shift is given by $v_{shift} = N_{ID}^{cell} \bmod 6$. For new carrier type, p=0 and the cell-specific frequency shift is given by $v_{shift} = \alpha$, where the value of $\alpha$ will be signaled by higher layer. The value of $\alpha$ can be any value between 0 to 5.

If the frequency shift for CRS is not applied for Rel-11 NCT, some CRS to CRS cancellation techniques that can be used at the UE for the purpose of more reliable other cell CRS detection. Such CRS cancellation scheme can be based on CRS cancellation by utilizing the detected cells and estimated channel similar to successive interference cancellation MIMO receiver where each layer is cancelled from the received signal after detection. Other more sophisticated solutions are also possible (e.g. joint CRS detection from multiple cells (similar to MIMO MLD)).

Design #1-2: CRS to CRS cancellation techniques can be used for NCT in order to improve the more reliable other cell CRS detection as described above.

Figure 6:
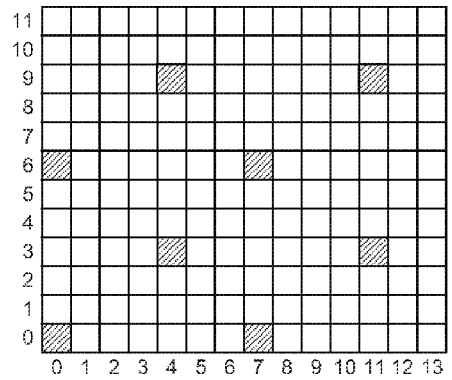
FIG. 6 illustrates a diagram of a cell-specific reference signal (CRS) design for antenna port 0, for different cell identifiers (ID) in accordance with an example.
Figure 6:
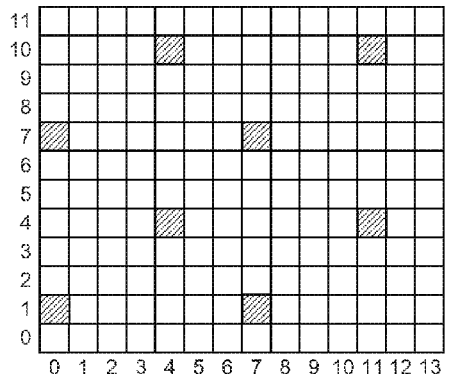
Figure 6:
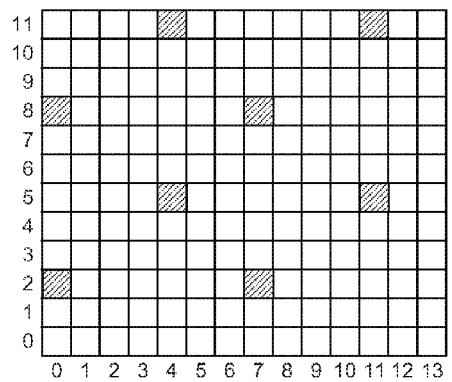
Figure 6:
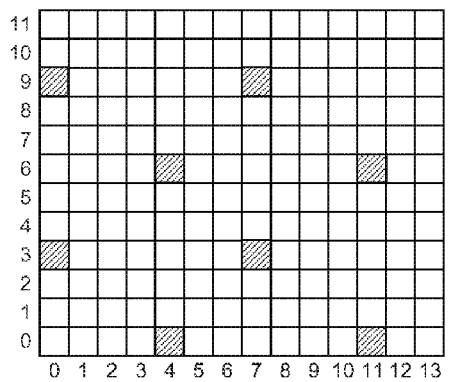
Figure 6:
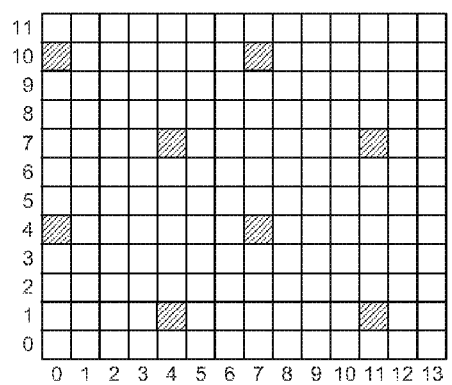
Figure 6:
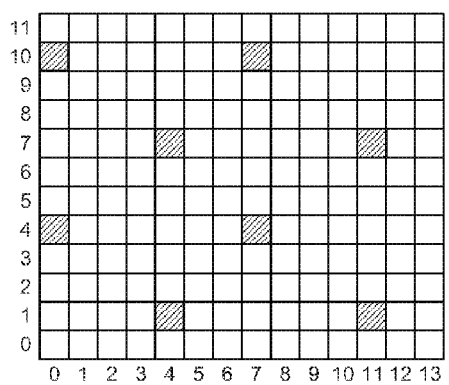
Figure 7:
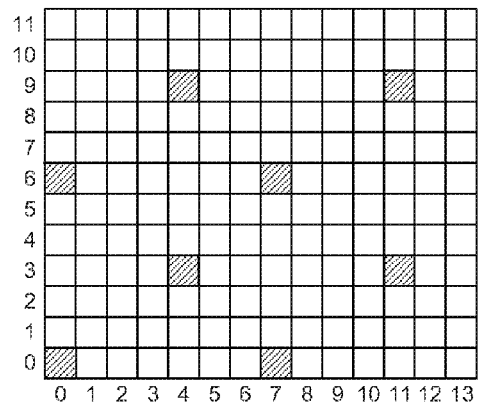
FIG. 7 illustrates a diagram of a cell-specific reference signal (CRS) design for antenna port 0, for different cell identifiers (ID) in accordance with an example.
Figure 7:
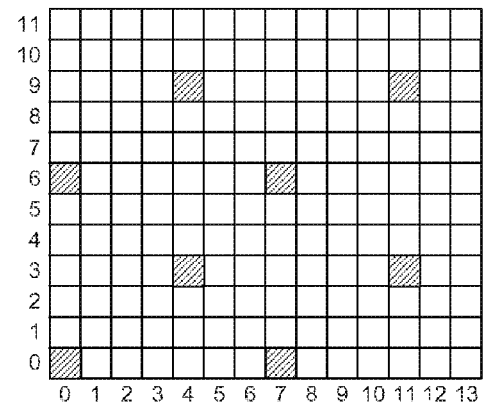
Figure 7:
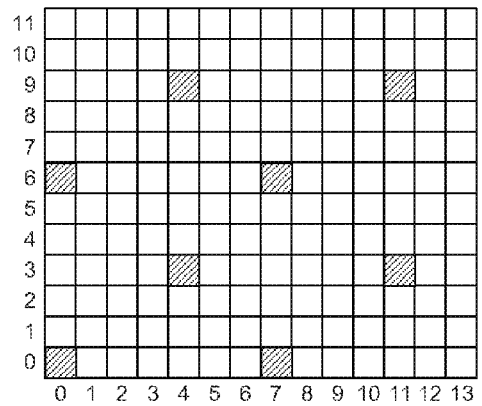
Figure 7:
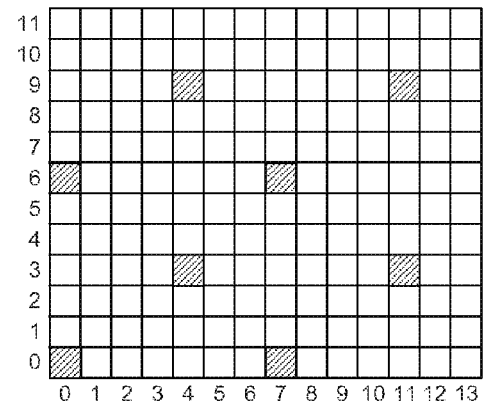
Figure 7:
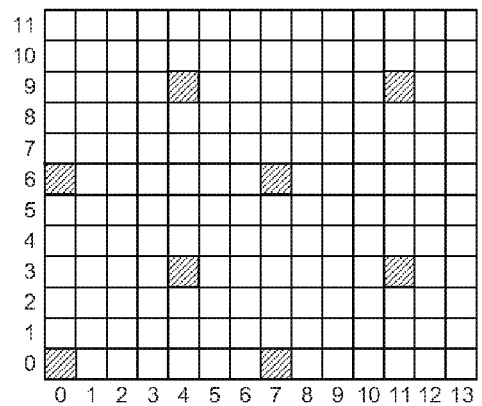
Figure 7:
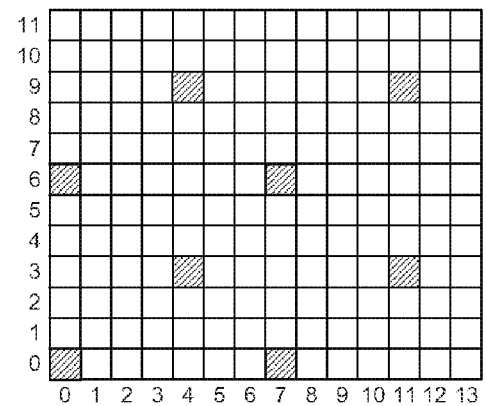

In FIGS. 6 and 7, existing Rel-8 CRS design and one possible CRS design for NCT is shown, respectively.

Design Concept 2: In Rel-8 CRS design, CRS is transmitted in every subframe. Therefore, no mechanism is needed to indicate which subframe will contain CRS signals, since UE will implicitly look for CRS in every subframe of a radio frame. However, in NCT design, CRS will be transmitted with 5 ms periodicity, i.e. only 2 subframe in a radio frame will contain CRS reference signal. So far, no mechanism is available to indicate the subframe containing CRS. We propose the following designs to indicate the CRS positions in a radio frame:

Design #2-1: CRS can only be transmitted in two predefined subframes within a radio frame. As for an example, CRS can only be transmitted in SF 0 and SF 5, or in SF 4 and SF 9 in a radio frame. In such case, no additional signaling is required to indicate the position of subframe containing CRS in a radio frame. UE can implicitly assume the position of CRS signals in NCT.

Design #2-2: A new parameter CRS-SubframeConfig $I_{CRS}$ can be introduced in Section 6.10.1 of 3GPP LTE Release 10 TS 36.211. Here, the value of $I_{CRS}$ can vary from 0 to 4. The value of $I_{CRS}$ can be periodically updated by higher layer signaling. A subframe containing CRS reference signal shall satisfy $$(\lfloor n_s/2 \rfloor - I_{CRS}) \bmod 5 = 0,$$

where $n_s$ indicates the slot number within a radio frame of 3GPP LTE Release 10 TS 36.211.

Figure 8:
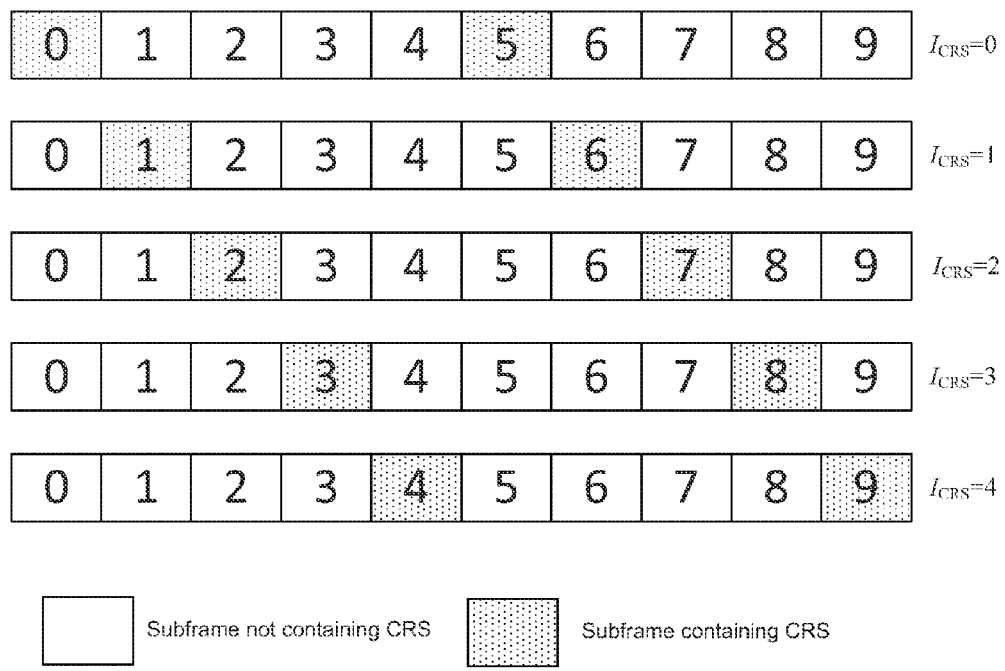
FIG. 8 illustrates a diagram of a new carrier type (NCT) cell-specific reference signal (CRS) design for antenna port 0, for different cell identifiers (ID), with $v_{shift}=0$ in accordance with an example.

Design #2-2 has several benefits over Design #2-1. In Rel-10 design, DMRS transmission in central six PRBs collides with the transmission PSS/SSS transmission. Therefore, DMRS signals cannot be transmitted in the central six PRBs where PSS/SSS is transmitted. In our companion IDF [2], we have provided a detail analysis and design proposal regarding this issue. One potential solution of this problem is to shift the transmission of PSS/SSS signals in any of the symbols 0 and 4 of both slots. However, if CRS is configured to be transmitted in the same subframe, a collision will occur between transmission of PSS/SSS signals and CRS signals in the center 6 RBs. By using option 2, CRS reference signals can be transmitted in different subframes from PSS/SSS transmission by proper choice of $I_{CRS}$ value. In FIG. 8, we present the position of CRS signals in a radio frame for different value of $I_{CRS}$.

Figure 9:
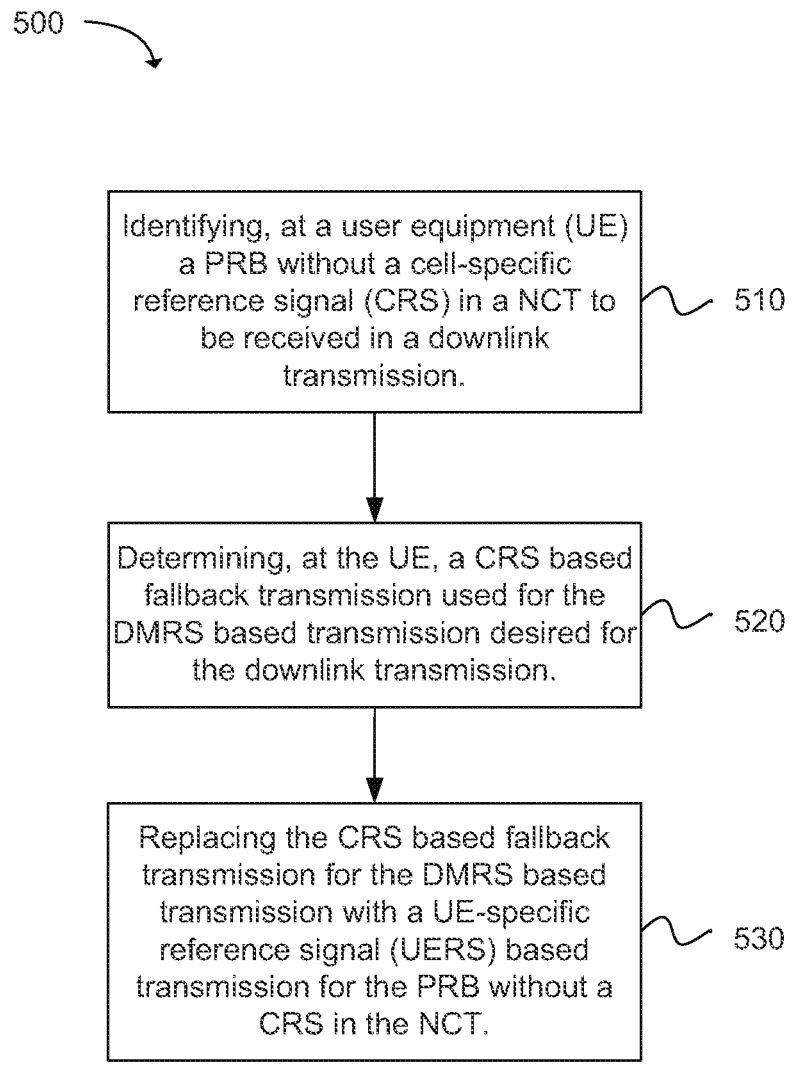
FIG. 9 depicts a flow chart of a method for selecting a fall-back transmission mode (TM) for a demodulation reference signal (DMRS) based transmission for a new carrier type (NCT) in accordance with an example.

Another example provides a method 500 for selecting a fall-back transmission mode (TM) for a demodulation reference signal (DMRS) based transmission for a new carrier type (NCT), as shown in the flow chart in FIG. 9. The method may be executed as instructions on a machine, where the instructions are included on at least one computer readable medium or one non-transitory machine readable storage medium. The method includes the operation of determining, at a user equipment (UE), a type of overhead RE received from a node, wherein the type of overhead RE is one of a rate matching overhead RE and a puncturing overhead RE, as in block 510. The operation of determining, at the UE, a CRS based fallback transmission used for the DMRS based transmission desired for the downlink transmission follows, as in block 520. The next operation of the method can be replacing the CRS based fallback transmission for the DMRS based transmission with a UE-specific reference signal (UERS) based transmission for the PRB without a CRS in the NCT, as in block 530.

Figure 10:
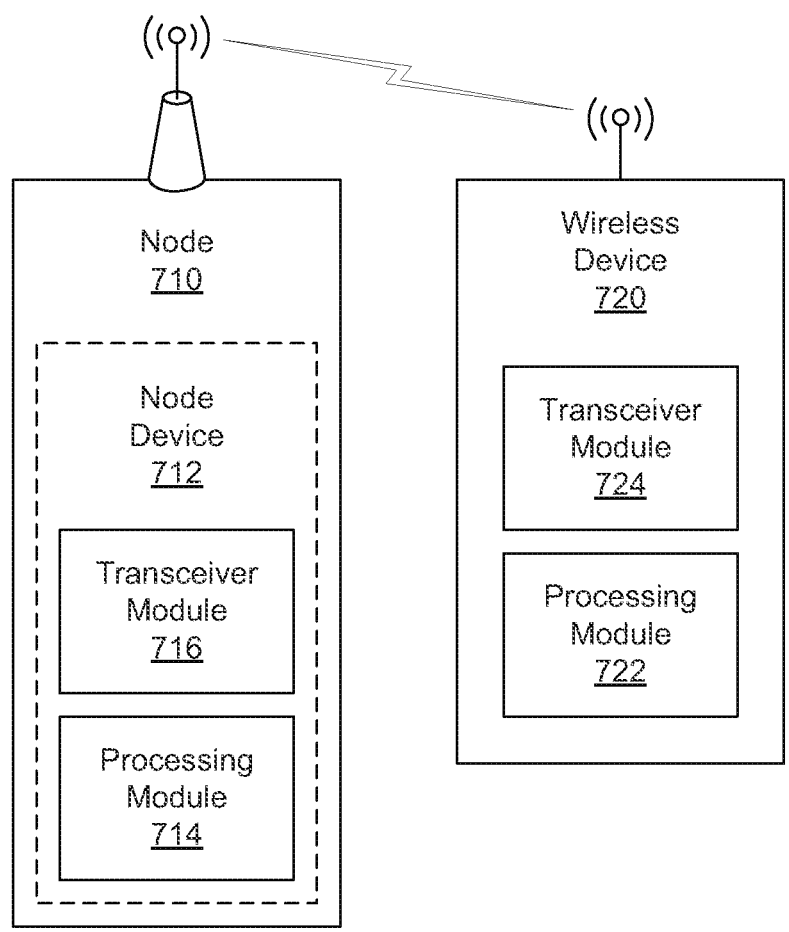
FIG. 10 illustrates a diagram of a node (e.g., eNB) and wireless device (e.g., UE) in accordance with an example.

FIG. 10 illustrates an example node 710 (e.g., eNB) and an example wireless device 720 (e.g., UE). The node can include a base station (BS), a Node B (NB), an evolved Node B (eNB), a baseband unit (BBU), a remote radio head (RRH), a remote radio equipment (RRE), a remote radio unit (RRU), or a central processing module (CPM). The node can include a node device 712. The node device or the node can be configured to communicate with the wireless device. The node device can be configured to implement the technology described. The node device can include a processing module 714 and a transceiver module 716.

The wireless device 720 can include a transceiver module 724 and a processing module 722. The wireless device can be configured to implement the technology described.

Figure 11:
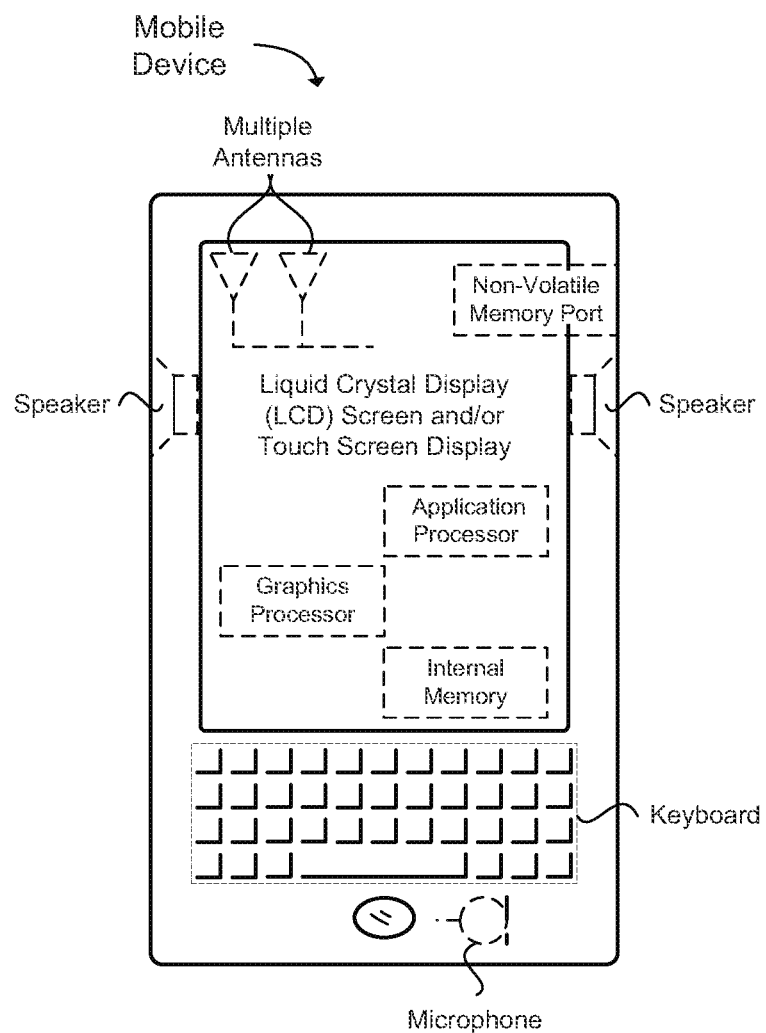
FIG. 11 illustrates a diagram of a wireless device (e.g., UE) in accordance with an example.

FIG. 11 provides an example illustration of the UE, such as a wireless device, a mobile station (MS), a mobile wireless device, a mobile communication device, a tablet, a handset, or other type of wireless device. The UE can include one or more antennas configured to communicate with a node, macro node, low power node (LPN), or transmission station, such as a base station (BS), an evolved Node B (eNB), a baseband unit (BBU), a remote radio head (RRH), a remote radio equipment (RRE), a relay station (RS), a radio equipment (RE), a central processing module (CPM), or other type of wireless wide area network (WWAN) access point. The UE can be configured to communicate using at least one wireless communication standard including 3GPP LTE, WiMAX, High Speed Packet Access (HSPA), Bluetooth, and WiFi. The UE can communicate using separate antennas for each wireless communication standard or shared antennas for multiple wireless communication standards. The UE can communicate in a wireless local area network (WLAN), a wireless personal area network (WPAN), and/or a WWAN.

FIG. 11 also provides an illustration of a microphone and one or more speakers that can be used for audio input and output from the UE. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the UE or wirelessly connected to the UE to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or tinier module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A node device operable in an evolved Node B (eNB) to select physical resource blocks (PRB) for cell-specific reference signal (CRS) transmission for a new carrier type (NCT), the node device comprising:
    a memory;
    a processor coupled to the memory, wherein the processor is configured with processor-executable instructions to perform operations comprising:
    selecting, using the processor, a CRS distribution pattern in a signal bandwidth for the NCT; and
    selecting, using the processor, a number of central PRBs less than a total number of PRBs in the signal bandwidth for a transmission of the CRS, wherein the signal bandwidth includes PRBs with CRS and PRBs without CRS.

2. The node device of claim 1, wherein the selected signal bandwidth includes a CRS distribution pattern that includes a subband of CRS PRBs at central PRBs and edge PRBs, wherein a subband is a set of k contiguous PRBs and k is a function of the signal bandwidth for a system.

3. The node device of claim 1, wherein the selected signal bandwidth includes a CRS distribution pattern that includes a distributive pattern of CRS PRBs in a remaining number of the total number of PRBs.

4. The node device of claim 1, wherein the processor is further configured with processor-executable instructions to perform operations comprising:
    rotating between a set of CRS distribution patterns in a frequency domain based on a subframe index in a time domain of the selected signal bandwidth.

5. The node device of claim 1, wherein the processor is further configured with processor-executable instructions to perform operations comprising:
    selecting a CRS periodicity for a transmission of the CRS in a time domain.

6. The node device of claim 1, wherein the processor is further configured with processor-executable instructions to perform operations comprising:
    determining a total number of antenna ports available for a CRS transmission; and
    selecting a reduced number of antenna ports for the CRS transmission less than the total number of antenna ports.

7. The node device of claim 1, wherein the processor is further configured with processor-executable instructions to perform operations comprising:
    removing a cell-specific frequency shifting of the CRS for the NCT.

8. The node device of claim 1, wherein the processor is further configured with processor-executable instructions to perform operations comprising:
    transmitting an indication to a user equipment (UE) of the CRS pattern, wherein the UE includes at least one of an antenna, a touch sensitive display screen, a speaker, a microphone, a graphics processor, an application processor, internal memory, a non-volatile memory port, and combinations thereof; and
    transmitting the PRBs in the signal bandwidth on a specified antenna port at a specified CRS periodicity, wherein the NCT is a non-stand alone NCT or a stand-alone NCT.

9. The node device of claim 1, wherein the processor is further configured with processor-executable instructions to perform operations comprising selecting the CRS pattern of PRBs for the transmission of the CRS, and further comprising:
    selecting, using the processor, a CRS distribution pattern having a IQ number of distributed subbands of PRBs for a transmission of the CRS in the signal bandwidth, wherein the signal bandwidth includes PRBs with CRS and PRBs without CRS.

10. The node device of claim 9, wherein $K_1$ is represented by 1 to $\lceil N_{RB}^{DL}/k \rceil$, where a subband is a set of k contiguous PRBs and k is a function of the signal bandwidth for a system, and $N_{RB}^{DL}$ is a number of PRBs for the signal bandwidth of the system.

11. The node device of claim 9, wherein the CRS distribution pattern includes a subband of CRS PRBs at central PRBs and edge PRBs, wherein a subband is a set of k contiguous PRBs and k is a function of the signal bandwidth for a system.

12. The node device of claim 9, wherein the processor is further configured with processor-executable instructions to perform operations comprising:
    rotating between a set of CRS distribution patterns in the frequency domain based on a subframe index in the time domain.

13. The node device of claim 9, wherein the processor is further configured with processor-executable instructions to perform operations comprising:

selecting a CRS periodicity for a transmission of the CRS in a time domain.

14. The node device of claim 9, wherein the processor is further configured with processor-executable instructions to perform operations comprising:
    determining a total number of antenna ports available for a CRS transmission; and
    selecting a reduced number of antenna ports for the CRS transmission less than the total number of antenna ports.

15. The node device of claim 9, wherein the processor is further configured with processor-executable instructions to perform operations comprising:
    removing a cell-specific frequency shifting of the CRS for the NCT.

16. The node device of claim 9, wherein the processor is further configured with processor-executable instructions to perform operations comprising:
    transmitting an indication to a user equipment (UE) of the CRS pattern, wherein the UE includes at least one of an antenna, a touch sensitive display screen, a speaker, a microphone, a graphics processor, an application processor, internal memory, a non-volatile memory port, and combinations thereof; and
    transmitting the PRBs in the signal bandwidth on a specified antenna port at a specified CRS periodicity, wherein the NCT is a non-stand alone NCT or a stand-alone NCT.

17. A node device operable in an evolved Node B (eNB) to select physical resource blocks (PRB) for cell-specific reference signal (CRS) transmission for a new carrier type (NCT), the node device comprising:
    a memory;
    a processor coupled to the memory, wherein the processor is configured with processor-executable instructions to perform operations comprising:
        selecting, using the processor, a signal bandwidth for the NCT;
        selecting, using the processor, a CRS pattern of PRBs for a transmission of the CRS in the signal bandwidth, wherein the signal bandwidth includes PRBs with CRS and PRBs without CRS; and
        selecting, using the processor, a CRS periodicity for a transmission of the CRS in the time domain.

18. The node device of claim 17, wherein the processor is further configured with processor-executable instructions to perform operations comprising:
    rotating between a set of CRS distribution patterns in the frequency domain based on a subframe index in the time domain.

19. The node device of claim 17, wherein the processor is further configured with processor-executable instructions to perform operations comprising:
    determining a total number of antenna ports available for a CRS transmission; and
    selecting a reduced number of antenna ports for the CRS transmission less than the total number of antenna ports.

20. The node device of claim 17, wherein the processor is further configured with processor-executable instructions to perform operations comprising:
    removing a cell-specific frequency shifting of the CRS for the NCT.

21. The node device of claim 17, wherein the processor is further configured with processor-executable instructions to perform operations comprising:
    transmitting an indication to a user equipment (UE) of the CRS pattern, wherein the UE includes at least one of an antenna, a touch sensitive display screen, a speaker, a microphone, a graphics processor, an application processor, internal memory, a non-volatile memory port, and combinations thereof; and
    transmitting the PRBs in the signal bandwidth on a specified antenna port at a specified CRS periodicity, wherein the NCT is a non-stand alone NCT or a stand-alone NCT.

22. A node device operable in an evolved Node B (eNB) to select physical resource blocks (PRB) for cell-specific reference signal (CRS) transmission for a new carrier type (NCT), the node device comprising:
    a memory;
    a processor coupled to the memory, wherein the processor is configured with processor-executable instructions to perform operations comprising:
        selecting, using the processor, a signal bandwidth for the NCT;
        selecting, using the processor, a CRS pattern of PRBs for a transmission of the CRS in the signal bandwidth, wherein the signal bandwidth includes PRBs with CRS and PRBs without CRS;
        determining a total number of antenna ports available for a CRS transmission; and
        selecting a reduced number of antenna ports for the CRS transmission less than the total number of antenna ports.

23. The node device of claim 22, wherein the processor is further configured with processor-executable instructions to perform operations comprising:
    rotating between a set of CRS distribution patterns in the frequency domain based on a subframe index in the time domain.

24. The node device of claim 22, wherein the processor is further configured with processor-executable instructions to perform operations comprising:
    transmitting an indication to a user equipment (UE) of the CRS pattern, wherein the UE includes at least one of an antenna, a touch sensitive display screen, a speaker, a microphone, a graphics processor, an application processor, internal memory, a non-volatile memory port, and combinations thereof; and
    transmitting the PRBs in the signal bandwidth on a specified antenna port at a specified CRS periodicity, wherein the NCT is a non-stand alone NCT or a stand-alone NCT.

25. A node device operable in an evolved Node B (eNB) to select physical resource blocks (PRB) for cell-specific reference signal (CRS) transmission for a new carrier type (NCT), the node device comprising:
    a memory;
    a processor coupled to the memory, wherein the processor is configured with processor-executable instructions to perform operations comprising:
        selecting, using the processor, a signal bandwidth for the NCT;
        selecting, using the processor, a CRS pattern of PRBs for a transmission of the CRS in the signal bandwidth, wherein the signal bandwidth includes PRBs with CRS and PRBs without CRS; and
        rotating between a set of CRS distribution patterns in the frequency domain based on a subframe index in the time domain.

26. The node device of claim 25, wherein the processor is further configured with processor-executable instructions to perform operations comprising:
- transmitting an indication to a user equipment (UE) of the CRS pattern, wherein the UE includes at least one of an antenna, a touch sensitive display screen, a speaker, a microphone, a graphics processor, an application processor, internal memory, a non-volatile memory port, and combinations thereof; and
- transmitting the PRBs in the signal bandwidth on a specified antenna port at a specified CRS periodicity, wherein the NCT is a non-stand alone NCT or a stand-alone NCT.

* * * * *